Dec. 21, 1926.

H. W. STEEGE

PORTABLE ELEVATOR

Filed March 20, 1926      3 Sheets-Sheet 3

1,611,291

Inventor

Henry W. Steege

By G.C. Kennedy
Attorney

Patented Dec. 21, 1926.

1,611,291

UNITED STATES PATENT OFFICE.

HENRY W. STEEGE, OF WATERLOO, IOWA.

PORTABLE ELEVATOR.

Application filed March 20, 1926. Serial No. 96,307.

My invention relates to improvements in portable elevators, particularly to elevators for lifting and delivering grain into buildings or other receptacles, and a primary object of the present invention is to provide therefor a telescopic stack made up of telescoping sections with means for adjustably mounting a movable section upon a relatively fixed section, and in combining with said movable section a terminal rockable delivery hood, whereby grain may be delivered into a conduit or a container of any kind at different elevations as may be necessary.

Another object of my improvements is to tiltably support the device upon a tractor, other portable or transportable prime mover or other suitable supporting structure, and furnish mechanism for tilting the device relative to said supporting structure adjustably and anchoring it in an adjusted position.

Other improvements will be described in detail hereinafter and included in certain of the appended claims.

The device of my said invention comprises an improved combination of cooperating mechanisms for the above purposes, based upon devices of my prior patents of the United States, No. 1,080,084 of December 2, 1913, and No. 1,135,735 of April 13, 1915.

My invention therefore resides in the combinations and arrangements of parts and in the details of construction hereinafter described and claimed, it being understood that changes in the precise embodiment of invention herein disclosed can be made within the scope of what is claimed without departing from the spirit of the invention.

Figure 1:
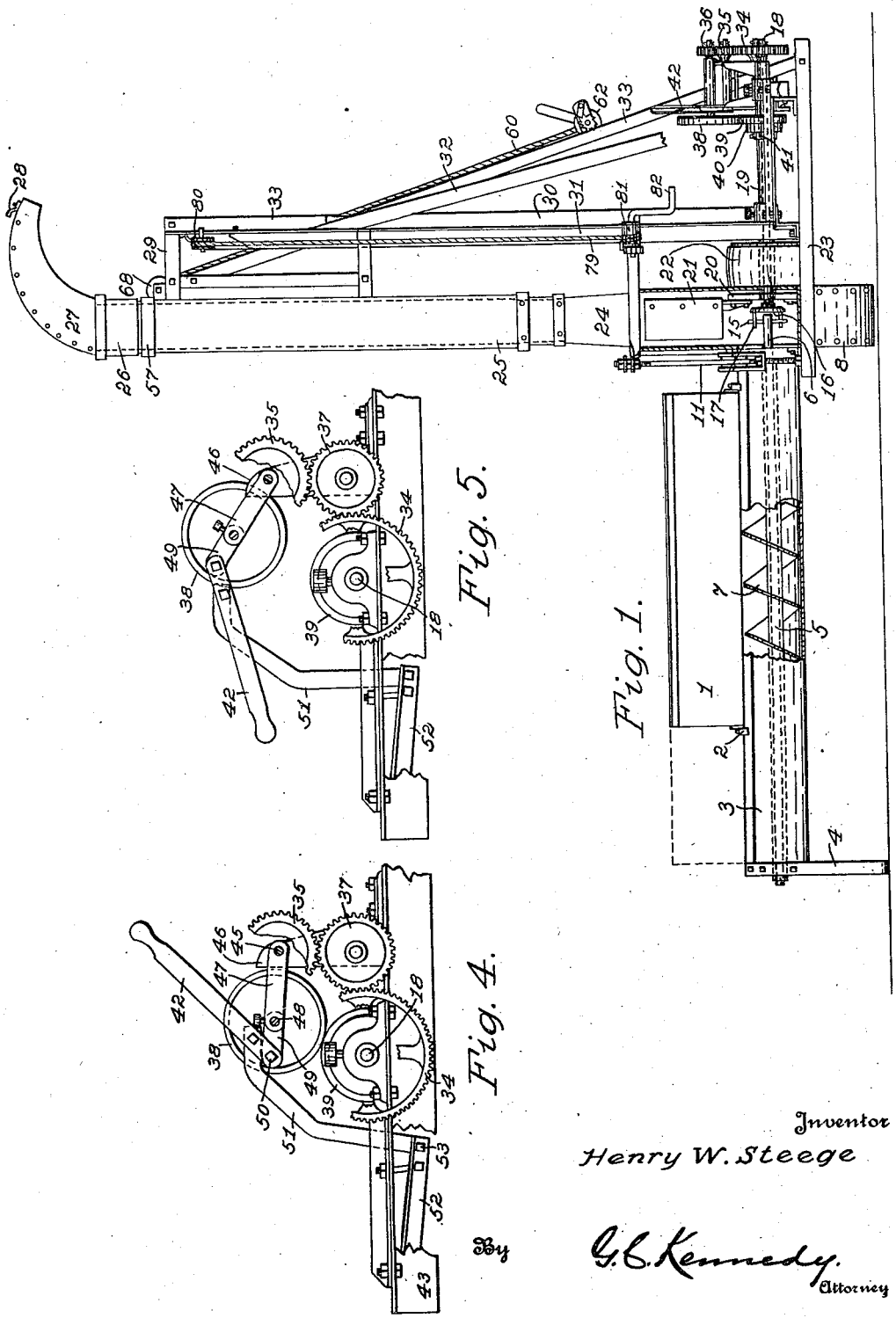
Figure 2:
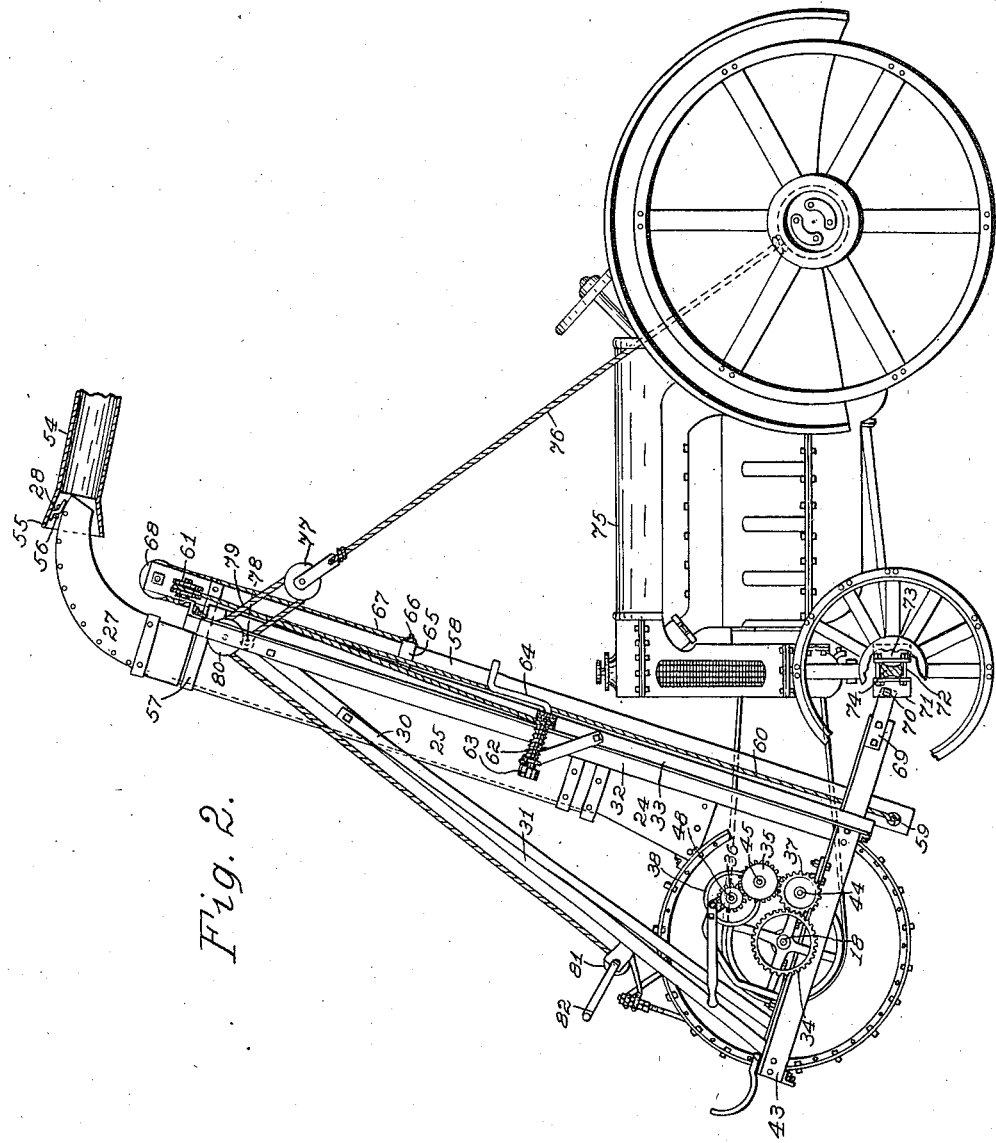
Figure 3:
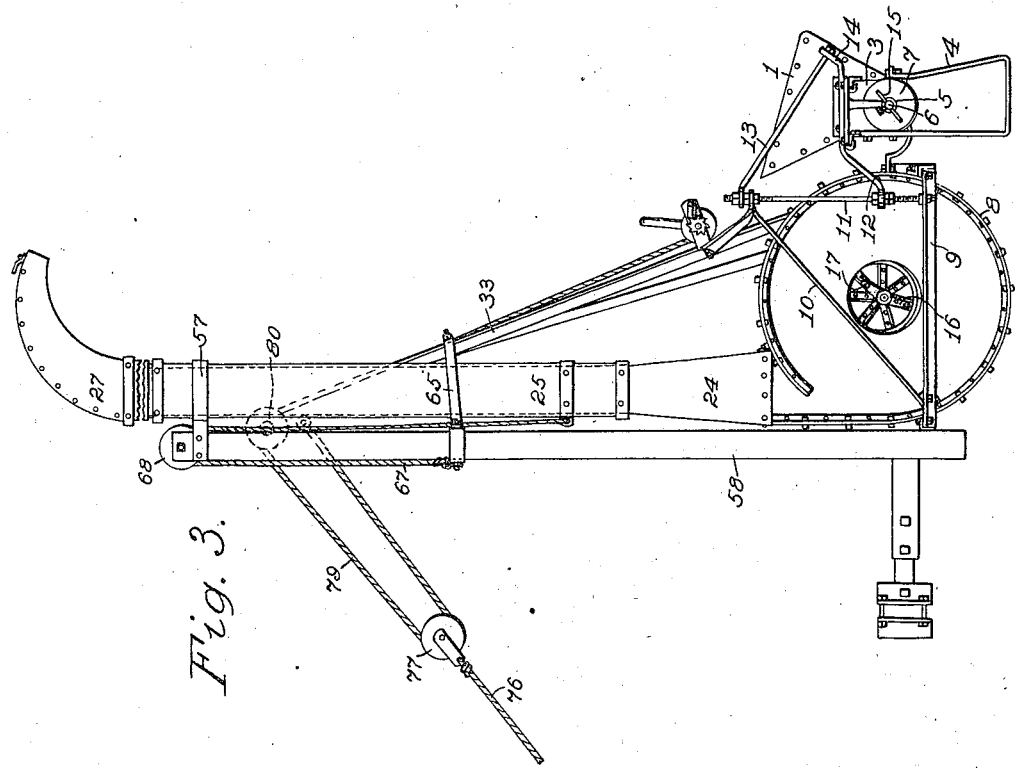

In the annexed drawings, Fig. 1 is a front elevation of my improved device, with parts removed or broken away. Fig. 2 is a side elevation thereof, including a side elevation of a propelling and transporting tractor therefor, with parts broken away. Fig. 3 is an elevation of the opposite side of the elevator as detached from the tractor, and showing the auger containing hopper hingedly swung around to the front of the elevator blower and stack. Figs. 4 and 5 are detail side elevations, partly in section or with parts broken away, and on a larger scale, of the gearing for adjustably driving and changing speed of the auger conveying device, and for driving at one speed the blower fan-wheel, Fig. 4 showing the friction gearing in engagement and Fig. 5 showing said gearing disengaged.

Referring to said Fig. 2, I have shown a tractor 75 as employed to transport the grain elevator device from place to place, and to propel its mechanism. The base members of the elevator frame are rigidly connected, the side members 43 having short extensions 69 whose rear ends are pivoted on pintle-bolts 70 mounted in the forward clamp elements 71 which with like but reversed clamp elements 73 engage opposite faces of the end parts of the front axle 74 of the tractor 75 and are connected by bolts 72. This hinging connection permits the frame base and its superstructures to be tilted back relatively to the tractor so as to clear the ground when the device is to be transported from place to place.

The lower ends of angle-bar frame members 31, 30, 32 and 33 are rigidly mounted upon and secured to elements 43 and 23 of said base and converge at their upper ends to be fastened to each other or to intermediate frame bars 29, thus supplying a relatively fixed composite mast for the device to support a vertically disposed and reciprocable mast 58, which in turn is at its upper end slidably connected by means of a slide ring 57 to the upper part of a movable section 25 of the telescopic sectional stack 24, the lower end of the latter being secured to and opening into a blower casing 8 also rigidly mounted upon the frame base 23—43. The movable mast 58 is held by its said connecting slide-ring 57 to the stack section 25. A pulley sheave 68 is rotatably mounted upon the top of a frame member 32 and carries a cable 67, one end of which depends and is secured at its lower end to an end of an arm 65 fixed on a frame member 33. The other end of the cable 67 depends and is connected at its lower end to the lower part of the movable stack part 25.

A pulley sheave 61 is rotatably mounted upon the upper part of one side of the movable mast 58 and carries a cable 60 having one end connected to a pin 59 at the lower part of said side, while the other end part is connected to and wound upon a winding-drum 62 mounted rotatably upon the frame member 33. Said drum is operated by means of a crank 64, and is held adjustably by a pawl and ratchet device 63. A pulley sheave 80 is rotatably mounted upon the upper part of the frame member 32 and carries a cable 79 whose depending forward end is connected to and wound upon a winding drum 81 mounted rotatably upon the frame member 33 and provided with an operating crank 82, and adjustably held by a pawl and ratchet device. The other end of the cable 79 is reeved about a loose sheave 77 and has its termination secured to a pin 78 on the frame member 32. A cable 76 has one end secured to a bail on the loose sheave 77 and its other end is secured and anchored to the rear part of the tractor 75, preferably to the rear axle housing thereof. The winding drum 81, with the said cables 79 and 76 are utilized in tilting the elevator device on its pintles 70 to a desired degree for transportation from place to place.

The winding drum 62 is used with the cable 60 to raise or lower the movable mast 58 a desired amount together with the movable section 25 of the stack 24, as the mast 58 carries the section 25 on its cable 67 which runs over the sheave 68, the latter being end anchored to the outer end of the fixed arm 65.

Upon the upper end of the movable stack section 25 is rockingly mounted a curved hood 27, which delivers into the squared receiving end 55 of a tubular conduit 54, and the latter may deliver grain into any receptacle at an elevation. A catch 28 is fixed upon the top of the hood 27 near its delivery end, and the squared part of the conduit 54 has a cross bolt 56 which may be engaged releasably with said catch to connect the conduit to the hood.

The numeral 3 denotes an open top trough having at its outer end a looped leg 4, and is connected swingingly by means of arms 12, 13 and 14 to a standard 11 fixed on the frame base member 9 and held by brace 10.

A longitudinal rotary shaft 6 is mounted within the trough 3 and carries an auger-shaped or screw-shaped conveyor 7 which, when the trough is alined with the blower casing 8, delivers grain thereinto received from a hopper 1 which by means of slide-lugs 2 is mounted slidingly adjustably upon the upper edges of the trough.

Referring to said Fig. 1, the inner end of the shaft 6 extends through a central opening in the blower casing and has a diametrical rod 15 fixed therein. In a hollow rotary shaft mounted on the frame base is mounted another rotary shaft 18 alined with said shaft 6 and carrying on its end abutting the latter a fixed disk 16 which has at opposite parts pins 17 which project across opposite sides of the ends of the rod 15. The hollow shaft 19 is mounted rotatably in spaced bearings on said frame base and carries on its end abutting upon said disk 16 the arms 20 which carry terminally the fan plates 21 in the blower casing 8. The shaft 19 also carries a pulley on which is a driving-belt 22 whose other end is driven by a pulley not shown, on and driven by the prime motor of said tractor 75.

A hub member 41 is slidably mounted on the shaft 19 and is held for longitudinal adjustment thereupon by a set-screw. This hub carries friction-wheels 39 and 40 of different diameters. On the outer end of the shaft 18 is secured a spur-gear 34 (see Figs. 4 and 5), in mesh with a spur-pinion 37 mounted rotatably on a shaft 44 on a fixed standard 46 on the base frame. On a fixed shaft 45 on said standard 46 is rotatably mounted another spur-pinion 35 in mesh with said pinion 37. An arm 47 is pivoted at one end upon the shaft 45 and carries at its other end a short rotary shaft 48 upon which is pivoted a linking arm 49. A spur-pinion 36 is secured on the shaft 48 and is in mesh with the pinion 35. Upon the same shaft 48 is secured also a friction-wheel 38. This friction-wheel 38 may be lifted into or out of driven contact with either of the friction-wheels 40 or 39 as adjusted therefor by means of a hand-lever 42. An end of this lever is pivoted at 50 to an end of the short link-arm 49, and is also pivoted to the upper end of a swing-arm 51 whose lower end is pivoted at 53 to an end of a fixed arm 52 secured to the base-frame.

It will be seen, that in either extreme position of the hand-lever 42, the linking connections above described are relatively located so that the lever is locked releasably beyond its dead center in holding the friction-wheel 38 in or out of contact with the friction-wheel 39, or 40 as the case may be. The hollow shaft 19 is rotated at a single speed in rotating the blower-fan 21 to drive grain through the telescopic stack 24—25 into the conduit 54. The gearing above described operates to drive the screw-conveyer 5—7 at a different rate of speed as the friction-wheels are in adjustment respectively, to convey grain into the blower casing 8. As the rod and pin connection 17 and 15 between the shafts 18 and 6 are separable, the trough 3 may be swung around in front of the blower casing 8, when it is necessary to pass through a gateway, or in transporting the device to and fro.

Having described my invention, what I claim as new, and desire to secure by Letters Patent, is:

1. In a device of the character described, a transportable supporting device, a base-frame swingingly supported thereon having erect connected frame elements, a sectional telescoping stack whose lowermost section is fixed on said base-frame, a mast adjustably movably positioned adjacent to said stack and connected to a movable section of the stack, means for moving said connected mast and stack section to and fro and holding them in adjusted relations to the fixed section of the stack, and means for adjustably tilting said base-frame upon said supporting device and holding it in adjusted positions.

2. In a device of the character described, a transportable supporting device, a base-frame swingingly supported thereon having erect connected frame elements, a sectional telescoping stack whose lowermost section is fixed on said base-frame, a mast adjustably movably positioned adjacent to said stack and connected to a movable section of the stack, means for moving said connected mast and stack section to and fro and holding them in adjusted relations to the fixed section of the stack, means for adjustably tilting said base-frame upon said supporting device and holding it in adjusted positions, and mechanism for propelling materials through said stack.

3. In a device of the character described, a transportable tractor, a base-frame swingingly supported thereon having erect frame elements, a sectional telescopic stack whose lowermost section is connected to the base-frame, a mast adjustably movably positioned adjacent to said stack and connected to a movable section of the stack, means mounted upon said frame elements for shifting said mast and connected section to telescope the latter upon the other section, means connected between said frame elements and said tractor operable to tilt the former relative to the latter and adjustably hold the former in an adjustably tilted position, a blower device for propelling materials through said stack, and a screw conveyer mounted swingingly upon said base-frame to swing into or out of communication with said blower device.

4. In a device of the character described, a transportable tractor, a base-frame swingingly supported thereon having erect frame elements, a sectional telescopic stack whose lowermost section is connected to the base-frame, a hollow hood rockingly mounted upon the uppermost section of said stack, a mast adjustably movably positioned adjacent to said stack and connected to the uppermost section of the stack, means mounted upon said frame elements for shifting said mast and said connected section to telescope the latter upon the other section, means connected between said frame elements and said tractor operable to shift the former relative to the latter and to anchor the former to the latter, a blower device for propelling materials through said stack, a conveyer device movable to carry materials to said blower device, and adjustable driving mechanism for driving said blower device at one speed while driving said conveyer device at any of differently determined speeds.

5. A device of the character described, comprising a tractor, a frame structure swingingly supported thereon to be tilted to and fro relative thereto, a blower-casing mounted in said structure containing blower mechanism, a sectional telescopic stack having a basal section fixedly communicating with said blower-casing, means for adjustably shifting another section of said stack telescopically upon said basal section and holding it in an adjusted position thereon, a curvate hollow hood rockingly mounted upon the delivery end of said telescoping section, a hollow conduit in communication with said hood and releasably connected thereto, and a conveyer device in communication with and delivering to said blower-casing.

6. A device of the character described, comprising a sectional telescopic stack composed of a lower relatively fixed tubular section and an upper section slidable thereon longitudinally, means for propelling material through said stack, a structure upon which said fixed tubular section is supported rigidly, an elongated beam positioned for longitudinal reciprocation alongside said stack, a sheave rotatably mounted on said beam at its upper end, a cable connected at one end to said beam, reeved about said sheave and connected at the other end to the lower part of said slidable upper stack section a ring rigidly bracketed on the upper part of said beam and slidably inclosing the upper part of said upper stack section, and means for adjustably moving said beam to and fro alongside said stack to exert upward traction upon said upper stack section telescopically along the lower section.

In testimony whereof I affix my signature.

HENRY W. STEEGE.